(12) United States Patent
Wang et al.

(10) Patent No.: US 11,003,639 B2
(45) Date of Patent: May 11, 2021

(54) DATABASE DATA MIGRATION METHOD, APPARATUS, TERMINAL, SYSTEM, AND STORAGE MEDIUM

(71) Applicant: TENCENT TECHNOLOGY (SHENZHEN) COMPANY LIMITED, Shenzhen (CN)

(72) Inventors: Jue Wang, Shenzhen (CN); Guwu Yi, Shenzhen (CN); Liang Ni, Shenzhen (CN); Fan Yang, Shenzhen (CN); Biao Xu, Shenzhen (CN); Rui Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 299 days.

(21) Appl. No.: 16/367,513

(22) Filed: Mar. 28, 2019

(65) Prior Publication Data
US 2019/0227998 A1 Jul. 25, 2019

Related U.S. Application Data

(63) Continuation of application No. PCT/CN2017/115237, filed on Dec. 8, 2017.

(30) Foreign Application Priority Data

Dec. 13, 2016 (CN) .......................... 201611149740.7

(51) Int. Cl.
G06F 16/21 (2019.01)
H04L 29/08 (2006.01)
(Continued)

(52) U.S. Cl.
CPC ........ *G06F 16/214* (2019.01); *H04L 61/2514* (2013.01); *H04L 63/0263* (2013.01);
(Continued)

(58) Field of Classification Search
CPC .............. G06F 16/214; H04L 61/2514; H04L 63/0263
See application file for complete search history.

(56) References Cited

U.S. PATENT DOCUMENTS 7,761,591 B2 7/2010 Graham
2007/0143398 A1 6/2007 Graham
(Continued)

FOREIGN PATENT DOCUMENTS

CN 103179192 A 6/2013
CN 103650426 A 3/2014
(Continued)

OTHER PUBLICATIONS

Feng, Si Quan "The Application of the Two-Way Network Address Changing at the Firewall" Electronic Technology and Software Engineering 7th Edition, Jul. 31, 2014.
(Continued)

*Primary Examiner* — Loc Tran
(74) *Attorney, Agent, or Firm* — Oblon, McClelland, Maier & Neustadt, L.L.P.

(57) ABSTRACT

A method of database data migration is described. A migration task of migrating data from a source database to a target database can be obtained. The migration task can include a network type of a source network with which the source database is connected. The target database can be located in
(Continued)

a cloud environment. A network connectivity policy is determined according to the network type of the source network of the source database. The network policy can indicate a configuration of a communication link between the source database and the target database. The communication link between the source database and the target database can be configured according to the network connectivity policy, such that the data can be migrated from the source database to the target database via the communication link.

17 Claims, 15 Drawing Sheets

(51) Int. Cl.
  *H04L 29/12* (2006.01)
  *H04L 29/06* (2006.01)
(52) U.S. Cl.
  CPC ............. *H04L 63/20* (2013.01); *H04L 67/02* (2013.01); *H04L 67/1097* (2013.01); *H04L 67/2814* (2013.01); *H04L 67/34* (2013.01)

(56) References Cited

U.S. PATENT DOCUMENTS

| | | | |
|---|---|---|---|
| 2017/0180567 A1* | 6/2017 | Sharma | H04M 3/42153 |
| 2018/0082073 A1* | 3/2018 | Trachy | G06F 11/1461 |

FOREIGN PATENT DOCUMENTS

| | | |
|---|---|---|
| CN | 104077401 A | 10/2014 |
| CN | 104363588 A | 2/2015 |
| CN | 104462119 A | 3/2016 |
| CN | 105591863 A | 5/2016 |
| CN | 105718570 A | 6/2016 |
| CN | 106131233 A | 11/2016 |
| CN | 106686070 A | 5/2017 |

OTHER PUBLICATIONS

Chinese Office Application dated May 7, 2019 in Chinese Application No. 201611149740.7 with concise English translation citing documents AA, AO-AT and AW therein.
Written Opinion and International Search Report dated Feb. 24, 2018 in PCT/CN2017/115237 with concise English translation citing documents AA, AO-AQ therein.

* cited by examiner

Source database information

| | |
|---|---|
| Source database type* | mysql deployed on a public network ▼ |
| Source database IP address* | 10.105.108.193 |
| Port number* | 3306 |
| Account | test |
| Password | **** |

DATABASE DATA MIGRATION METHOD, APPARATUS, TERMINAL, SYSTEM, AND STORAGE MEDIUM

RELATED APPLICATION

This application is a continuation of International Patent Application No. PCT/CN2017/115237, filed on Dec. 8, 2017, which claims priority to Chinese Patent Application No. 201611149740.7, entitled "DATABASE MIGRATION METHOD, APPARATUS, TERMINAL, AND SYSTEM" filed with the Patent Office of China on Dec. 13, 2016. The entire disclosures of the prior applications are hereby incorporated by reference in their entirety.

FIELD OF THE TECHNOLOGY

The present disclosure relates to database data migration techniques.

BACKGROUND OF THE DISCLOSURE

More and more data is expected to be stored with cloud based storage services. Particularly, storing data of a database having a large data volume and complex data relationships on cloud servers can save storage costs. However, to ensure security of data in the cloud, cloud servers cannot be directly connected to networks of users, and complex network transferring needs to be performed to communicate between user ends and the cloud servers.

SUMMARY

A method of database data migration is described. A migration task of migrating data from a source database to a target database can be obtained. The migration task can include a network type of a source network with which the source database is connected. The target database can be located in a cloud environment. A network connectivity policy can be determined according to the network type of the source network of the source database. The network policy can indicate a configuration of a communication link between the source database and the target database. The communication link between the source database and the target database can be configured according to the network connectivity policy, such that the data can be migrated from the source database to the target database via the communication link.

An apparatus of database migration is described. The apparatus can include circuitry configured to obtain a migration task of migrating data from a source database to a target database. The migration task can include a network type of a source network with which the source database is connected. The target database can be located in a cloud environment. The circuitry can be further configured to determine a network connectivity policy according to the network type of the source network of the source database. The network policy can indicate a configuration of a communication link between the source database and the target database. The communication link between the source database and the target database can be configured according to the network connectivity policy, such that the data can be migrated from the source database to the target database via the communication link.

A non-transitory computer-readable medium is provided. The medium can store a program executable by a processor to perform the method of database data migration.

BRIEF DESCRIPTION OF THE DRAWINGS

To describe the technical solutions in the embodiments of the present disclosure or in the related technology more clearly, the following briefly describes the accompanying drawings for describing the embodiments or the related technology. The accompanying drawings in the following description show merely some embodiments of the present disclosure, and a person of ordinary skill in the art may still derive other drawings from these accompanying drawings.

DESCRIPTION OF EMBODIMENTS

The following clearly and completely describes the technical solutions in the embodiments of the present disclosure with reference to the accompanying drawings in the embodiments of the present disclosure. The described embodiments are only some embodiments instead of all embodiments of this application. All other embodiments obtained by a person of ordinary skill in the art based on the embodiments of this application shall fall within the protection scope of this application.

With development of cloud technologies and Internet technologies, more different network environments appear. Diversity and complexity of network environments are increased. Consequently, intercommunication of data between a user end and a cloud server becomes more difficult. Correspondingly, it would also be more difficult to migrate a user end database or database data to a cloud server.

Figures 1, 2:
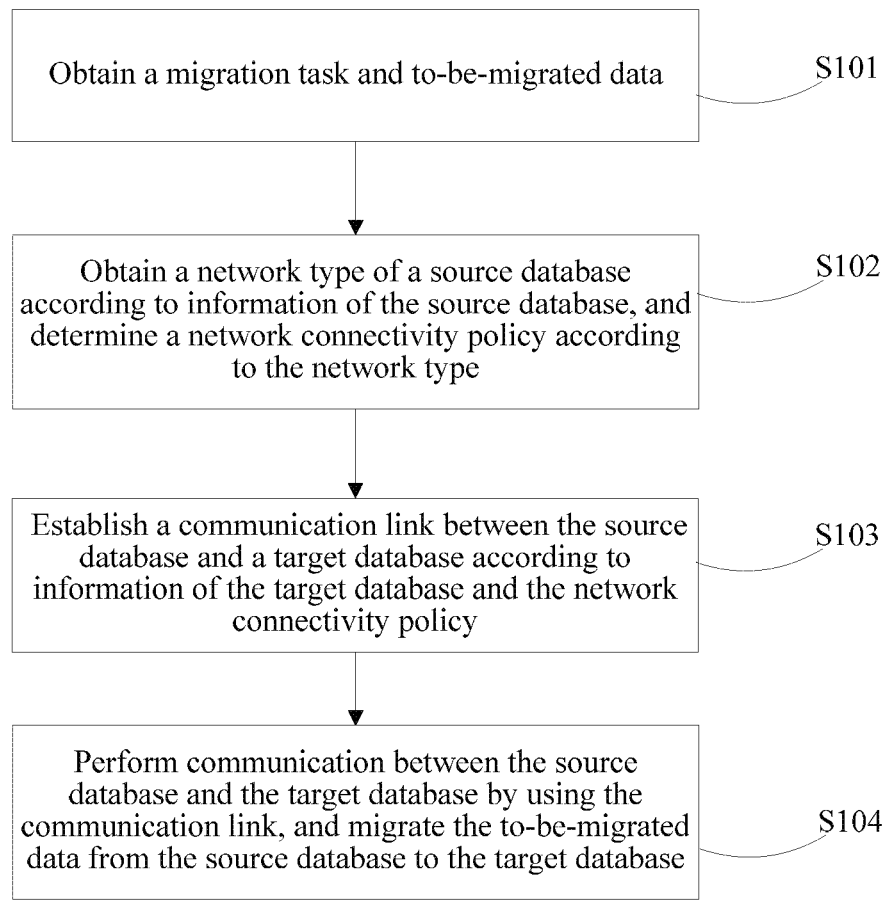
FIG. 1 is a flowchart of a database data migration method according to an embodiment of the present disclosure.
FIG. 2 is a schematic diagram of an attribute configuration when a source database is deployed in a private network in a cloud environment according to an embodiment of the present disclosure.

In view of this, the embodiments provide a database data migration method, executed by a data migration apparatus. The foregoing data migration apparatus may be located on a management system platform for data migration such as a database management system of a specific enterprise. As shown in FIG. 1, in an embodiment, the method includes:

S101. Obtain a migration task and to-be-migrated data.

In this embodiment of the present disclosure, the migration task may be created on a source data terminal, the source data terminal may be a terminal on which the source database is located, the task includes a task identifier, information of the source database, and information of a target database, and the information of the target database includes an identifier of the target database. In this embodiment of the present disclosure, the target database and the source database may be databases of a same type or different types. Types of the target database and the source database both include, but are not limited to, a relational database. In this embodiment of the present disclosure, the target database may be deployed in a cloud environment, that is, a Cloud DataBase (CDB), and specifically, may be deployed on a server, a terminal, or a virtual machine located in a cloud environment. In this embodiment of the present disclosure, the source database cannot be directly connected to the target database located in the cloud environment.

In some embodiments, the information of the source database includes a type of the source database and an attribute parameter corresponding to the type of the source database, and a network type of the source database can be obtained according to the type of the source database. Different attribute parameters can be obtained for different types of source databases.

In an example, the source database is a database deployed on a cloud server (Cloud Virtual Machine, CVM) of a cloud-environment private network (Virtual Private Cloud, VPC), as shown in FIG. 2, and the attribute parameter includes an identifier of the source database, an IP address and a port number of the source database, and authorization information. A source database deployed on a physical device or a virtual device in a cloud environment has its unique identifier. Further, in FIG. 2, it can provide an account and a password as authorization information. The target database can access the source database after obtaining a legal account and password, so as to migrate data in the source database to the target database.

The cloud-environment private network (VPC) may be an independent network space in a cloud environment, and in the private network, a user (an owner) can customize network segmentation, an IP address, and a route policy. Further, the user may alternatively connect the private network to another resource in the cloud environment by establishing a public network or a private line, to construct a hybrid cloud. The cloud server (e.g., CVM) can be a high-performance high-stability cloud virtual machine, can be used for providing a calculation capacity with an adjustable size in a cloud, to reduce difficulty in calculation scale prediction for the user, and may alternatively expand, according to actual requirements, the capacity rapidly by means of mirroring.

Figures 3, 4:
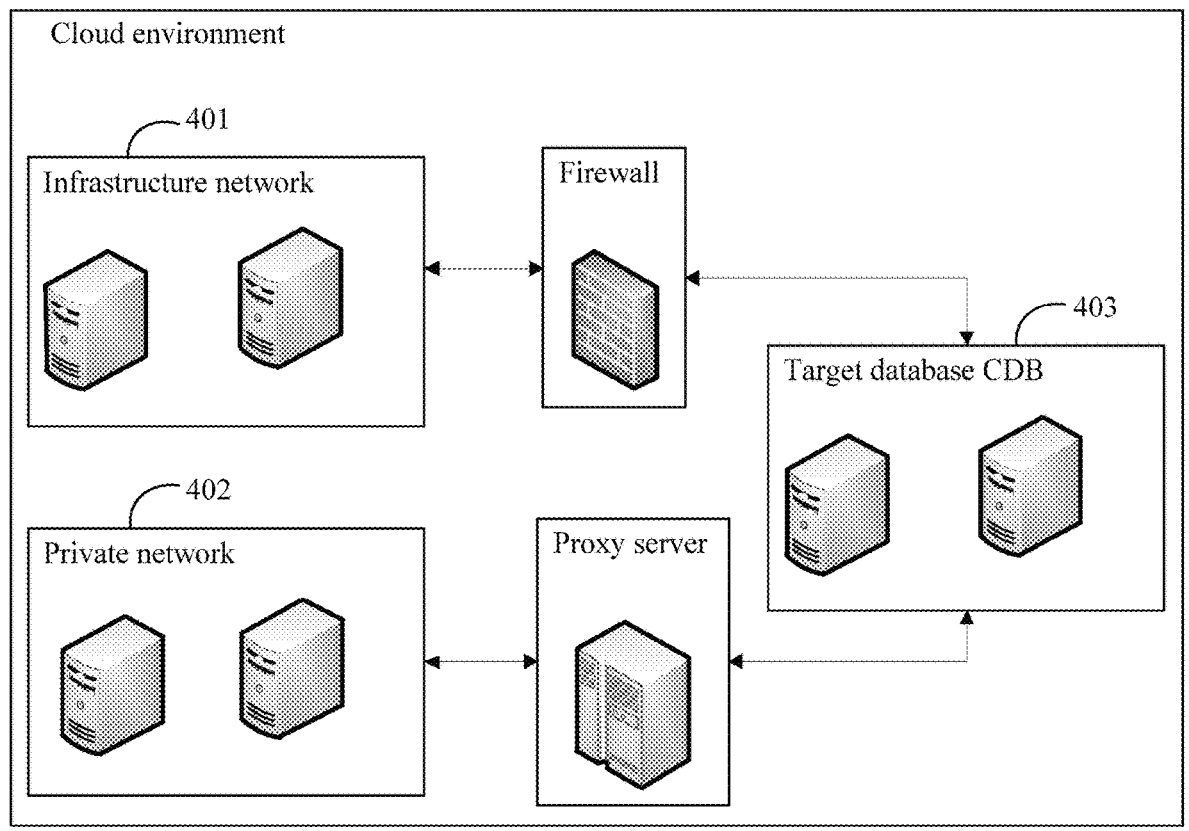
FIG. 3 is a schematic diagram of an attribute configuration when a source database is deployed in a public network outside a cloud environment according to an embodiment of the present disclosure.
FIG. 4 is a schematic diagram of a network in a cloud environment according to an embodiment of the present disclosure.

In an example, the source database is a database deployed on a terminal of a public network outside a cloud environment, as shown in FIG. 3, and the attribute parameter includes an IP address and a port number of the source database. In this embodiment of the present disclosure, an account and a password are further provided as authorization information. The public network may be a network located in an Internet data center (IDC), and the IDC is a standard telecommunications professional equipment room environment established by a telecommunications sector by using related Internet communications lines and wideband resources, and provides all-around services, such as server hosting and rental, and related value-added services, for enterprises and the government.

S102. Obtain a network type of the source database according to the information of the source database, and obtain (determine) a network connectivity policy according to the network type.

In an embodiment, the source database may be of various network types, and the network types include, but are not limited to, an infrastructure network in a cloud environment, a private network in a cloud environment, an IDC network interconnected to a private network that is in a cloud environment, and a public network outside a cloud environment. The IDC network can be a network that is located in an IDC and that is outside a cloud environment.

In some embodiments, the infrastructure network in a cloud environment and the private network in a cloud environment are both located in a cloud environment, and the cloud environment can be a cloud platform capable of providing calculation and storage capabilities for enterprises and individuals. As shown in FIG. 4, an infrastructure network 401 in the cloud environment is a public network in the public cloud platform, and a private network 402 in the cloud environment is an individual network space in the public cloud platform, and its network segmentation, IP address, and route policy all can be customized by a user. Source databases located in the infrastructure network 401 and the private network 402 cannot be directly connected to a target database CDB 403.

Figure 5:
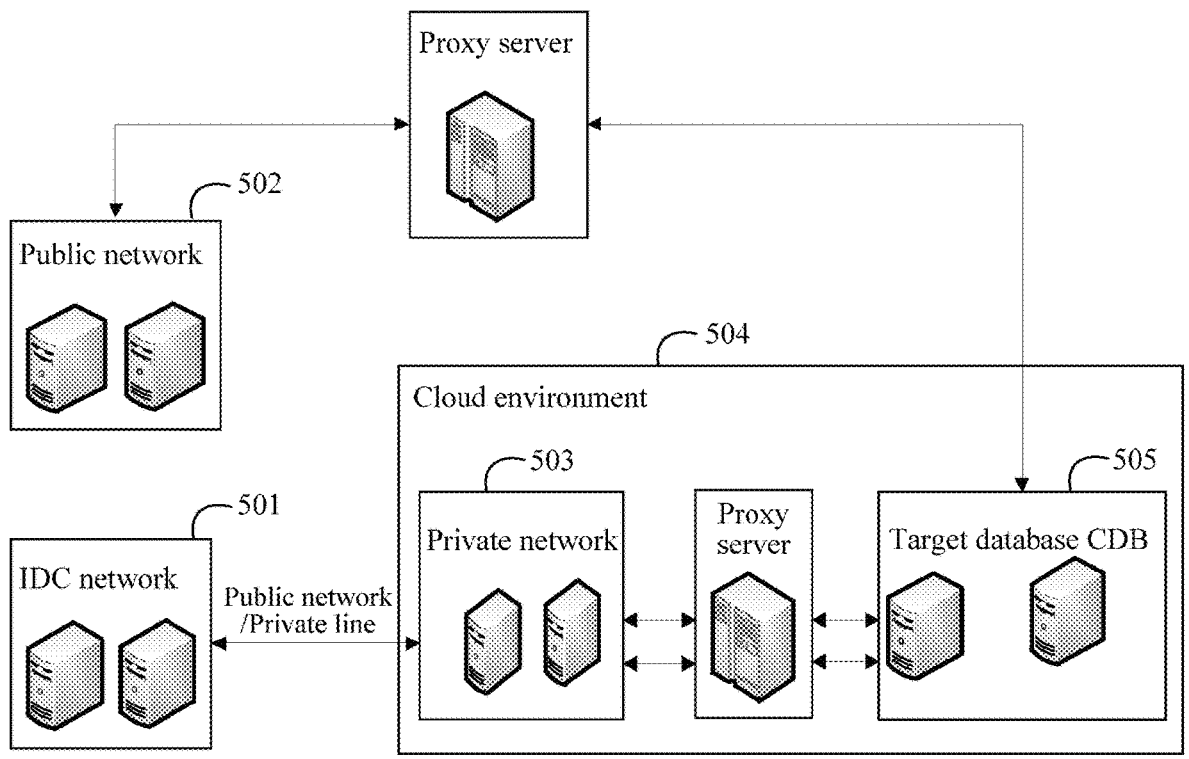
FIG. 5 is a schematic diagram of a network outside a cloud environment according to an embodiment of the present disclosure.

As shown in FIG. 5, an IDC network 501 interconnected to a private network 503 in a cloud environment 504 and a public network 502 outside a cloud environment are both networks outside a cloud environment. The public network outside the cloud environment is a network space constructed by using a non-reserved address (e.g. non-private address) on the Internet. The IDC is an Internet data center and aims at providing secure and reliable large-scale high-quality professional services, such as server hosting, space rental, network wholesale bandwidth, and ASP and EC services, for Internet content providers (ICPs), enterprises, media, and various websites, and the IDC network 501 may be intercommunicated with the private network 503 in the cloud environment 504 through a public network or a private line. Neither a source database located in the IDC network 501 interconnected to the private network 503 in the cloud environment 504 nor a source database in the public network 502 outside the cloud environment 504 can be directly connected to a target database CDB 505. The network connectivity policy herein may be understood as a gateway, or as a configuration of one or more gate ways, and is used for resolving a network conflict problem caused by that a source database and a target database are located in different network environments, and can translate an address of the source database into an address conforming to an address protocol of the target database, or translate an address of the target database into an address conforming to an address protocol of the source database, thereby further implementing intercommunication of data between the source database and the target database.

S103. Establish a communication link between the source database and the target database according to the information of the target database and the network connectivity policy. In some embodiments, equipment deployed over the communication link, such as a proxy server (e.g., route management-based access proxy, or network translation-based access proxy), network address translation (NAT) gateway, firewall, and the like, are configured, such that data can be transferred from the source database to the target database.

S104. Perform communication between the source database and the target database along the communication link, and migrate the to-be-migrated data from the source database to the target database.

For example, data migration may be performed in two different ways:

Data migration may be completed by transferring a data packet between the source database and the target database.

Communication between the source database and the target database may be performed by transferring the data packet between the source database and the target database, and to-be-migrated data in the source database is obtained by a transit server located in a same network environment as the target server, and the to-be-migrated data is poured into the target database from the transit server. In this embodiment of the present invention, the transit server can directly communicate with the target database, and a communication link between the transit server and the source database is established in a manner the same as a manner in which a communication link between the source database and the target database is established.

The transit server, compared with the target database, has a greater storage capacity and better performance, and therefore, can improve a speed at which the to-be-migrated data in the source database is obtained, and after the to-be-migrated data is obtained, a process of inputting the to-be-migrated data into the target database may be completed in the cloud environment, thereby saving a waiting time of a user during a data migration process. Further, if the capacity of the target database is slightly different from the capacity of the source database, the first data migration manner may fail, and in this case, it is more proper to perform data migration in a second manner.

The database data migration method provided in embodiments of the present disclosure covers various database environments, and network types supported by the database data migration method include an infrastructure network (e.g., the infrastructure network 401), a VPC network (e.g., the private network 402), an DC environment (e.g., the IDC network 501), and a public network (e.g., the public network (502), thereby notably reducing difficulty in data migration performed by a user.

In an embodiment of the present disclosure, a method for obtaining or determining a network connectivity policy according to a network type includes:

A first network connectivity policy may be determined when the network type is an infrastructure network in a cloud environment (e.g., the infrastructure network 401), and in the first network connectivity policy, a communication link is established between the source database and the target database by configuring a firewall.

If the network type is an infrastructure network in a cloud environment, the source database is also located in the cloud environment. Specifically, the source database may be deployed on a network server in the cloud environment or a specific virtual machine in the cloud environment. Communication between the source database and target database may be blocked by a firewall on the side of the source database, and intercommunication of data cannot be directly performed. Therefore, internetworking between the source database and the target database can be quickly implemented by modifying configuration of the firewall on the side of the source database.

A second network connectivity policy may be determined when the network type is a public network outside a cloud environment (e.g., the public network (502), and in the second network connectivity policy, a communication link is established between the source database and the target database by using a route management-based access proxy.

A third network connectivity policy may be obtained if the network type is a private network in a cloud environment (e.g., the private network 402) or an DC network (e.g., the DC network 501) interconnected to a private network that is in a cloud environment, and in the third network connectivity policy, a communication link is established between the source database and the target database by using a bi-directional network address translation-based access proxy. The third network connectivity policy, compared with the second network connectivity policy, is more adaptable, and therefore, is applicable to a private network in a cloud environment having a relatively complex topological environment or an DC network interconnected to a private network in a cloud environment.

In this embodiment of the present disclosure, network types are classified, and network topological features of different network types are considered comprehensively, so as to employ a suitable network connectivity policy, thereby achieving a better connectivity effect.

Figure 6:
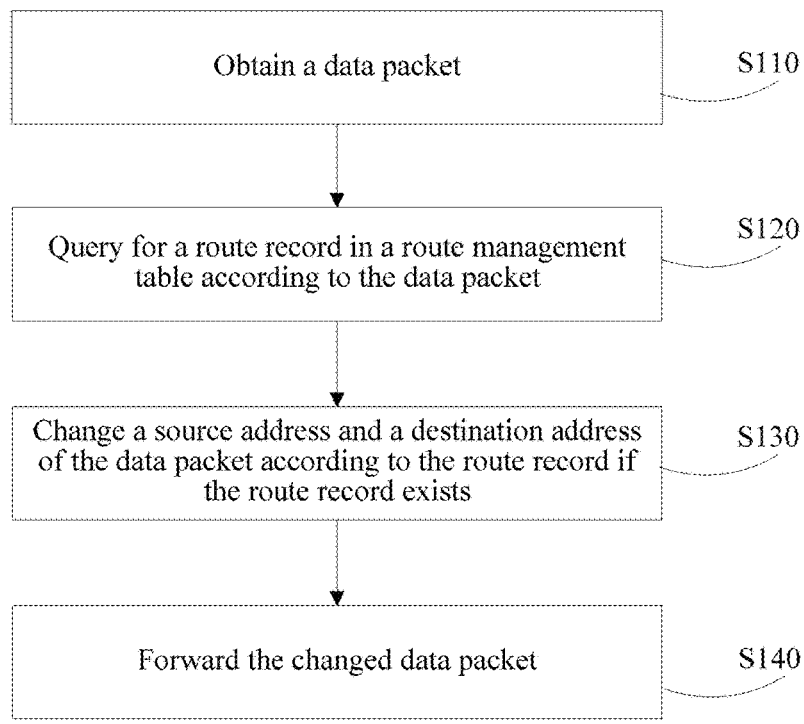
FIG. 6 is a flowchart of a method for implementing a second network connectivity policy according to an embodiment of the present disclosure.

In an example process, as shown in FIG. 6, a communication link is established between the source database and the target database according to the second network connectivity policy when the network type is a public network outside a cloud environment (e.g., the public network (502). The process can include:

S110. Obtain a data packet, the data packet being from the source database or the target database.

S120. Query for a route record in a route management table according to the data packet.

S130. Change a source address and a destination address of the data packet according to the route record if the route record exists.

For example, the route record, as a basis of destination network address translation (DNAT), records a one-to-one correspondence between a first network address before the translation, and a second network address after the translation. During the query process, if there is a route record, and a first network address in the route record is consistent with the destination address of the data packet, during a destination address translation (DNAT) process, the destination address is translated, according to the route record, into a second network address consistent with the first network address.

In this embodiment of the present disclosure, according to a preset source address obtaining algorithm, during source address translation (SNAT), an alternative source address is obtained, and the source address in the data packet is translated into the alternative source address.

In this embodiment of the present disclosure, an objective of performing destination address translation (DNAT) is to map a network address located in a first network space to a second network space, so as to forward a data packet, thereby resolving a problem that intercommunication of data cannot be performed between the source database and the target database. The reason why source network address translation (SNAT) is performed is that after data is sent to the second network space, a source address of the original data packet is a valid address of the first network space, but the source address of the data packet in the second network space may become an invalid address. Therefore, source address translation (SNAT) can be performed to avoid invalid addresses. As an example, there are various generation algorithms for the alternative source address. In this embodiment, an idle network address is randomly obtained in the second network space, and the network address is applied to the source address translation (SNAT) as an alternative source address.

S140. Forward the changed data packet.

As an example, using forwarding a data packet from a target database as an example, a network address the target database is 10.238.158.161. The data packet is finally sent to a source database, and a network address of the source database is 119.1.3.6.

First, a data packet is obtained, a source address of the data packet is 10.238.158.161, and a destination address is 10.0.0.3.

After the data packet is obtained, a route record is queried for and if a route record having a first network address of 10.0.0.3 is found in a route management table, and a corresponding second network address in the route record is 119.1.3.6, destination address translation (DNAT) may be performed to change the destination address in the data packet into 119.1.3.6.

An alternative source address 119.1.2.2 may be obtained according to a preset source address generation algorithm, and source address translation (SNAT) may be performed to change the source address in the data packet into 119.1.2.2.

The data packet having a source address that is 119.1.2.2 and having a destination address that is 119.1.3.6 is forwarded.

Further, before querying for a route record in a route management table according to the data packet, the method can further include:

obtaining a route addition request from a policy service platform, the route addition request being generated by the policy service platform according to the migration task; and adding a route record to the route management table according to the route addition request.

For example, after a migration task is generated, the migration task may be sent to a policy service platform, and the task includes a task identifier, information of the source database, and an identifier of the target database. The policy service platform may be configured to manage a routing rule of a proxy server according to the obtained migration task, and a proxy server manages a full route record in the proxy server by using a route management table, and establishes a communication link between the source database and the target database in a routing manner.

In some embodiments, the policy service platform may perform route management on the proxy server in a manner of sending a route addition request, a route deletion request, and/or a route query request to the proxy server based on the HyperText Transfer Protocol (HTTP) in order to forward a data packet by using the proxy server.

Further, a policy service database may be further disposed in the policy service platform, the policy service database can be configured to record the route addition request, the route deletion request, and/or the route query request sent by the policy service platform to the proxy server, and can be further configured to record the obtained migration task.

In some embodiments of the present disclosure, the proxy server has permission to access the source network address and the target network address at the same time. An HTTP service runs in the proxy server. The HTTP is the HyperText Transfer Protocol. The proxy server communicates with the policy service platform by means of the HTTP service, to obtain the route addition request, the route deletion request, and/or the route query request from the policy service platform. The route management table may be managed according to specific content of the request, and a corresponding iptables operation may be performed. The iptables may be an IP information packet filtering system integrated with the latest Linux kernel 3.5. If a Linux system is connected to the Internet or a LAN, a server, or a proxy server connected to a LAN and the Internet, the system is beneficial to controlling IP information packet filtering and firewall configuration on the Linux system.

Figure 7:
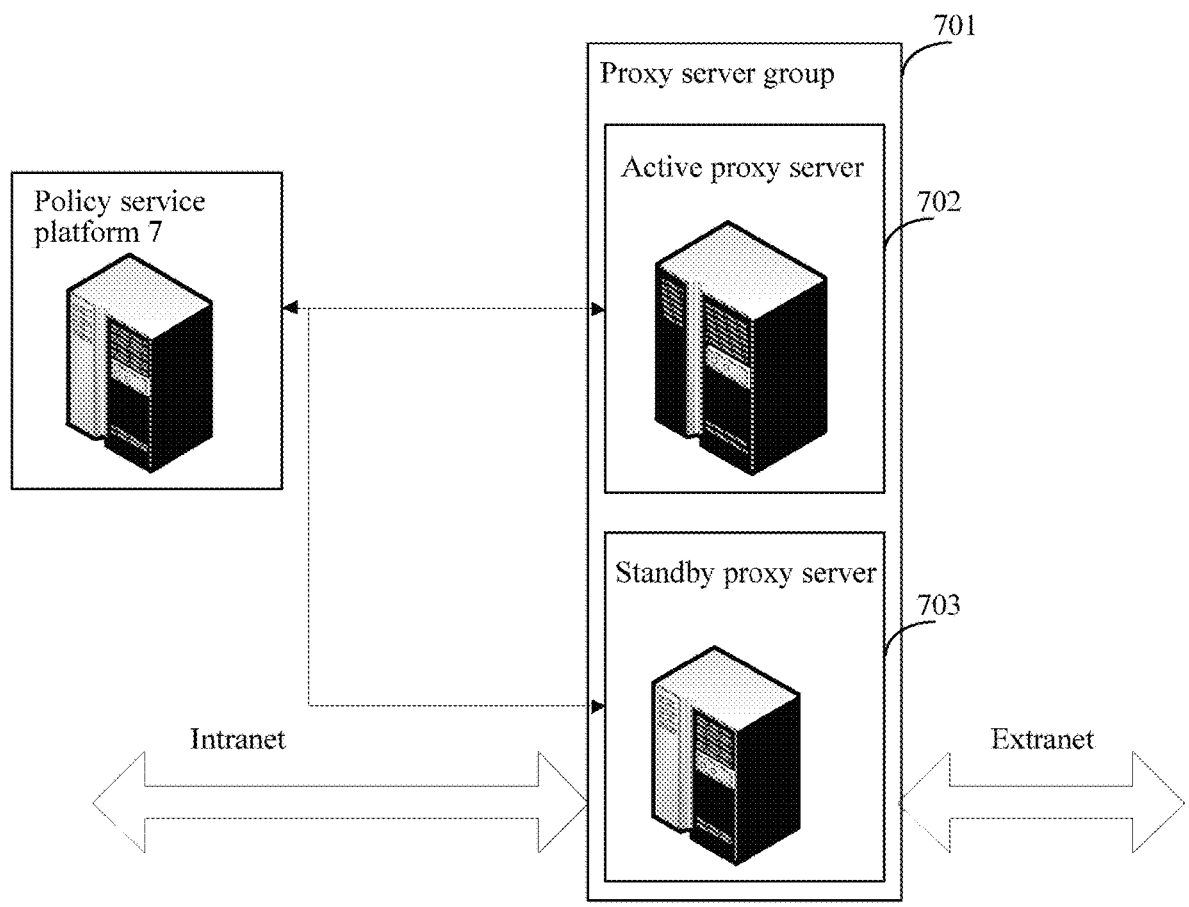
FIG. 7 is a schematic diagram of a proxy server distribution according to an embodiment of the present disclosure.
Figure 8:
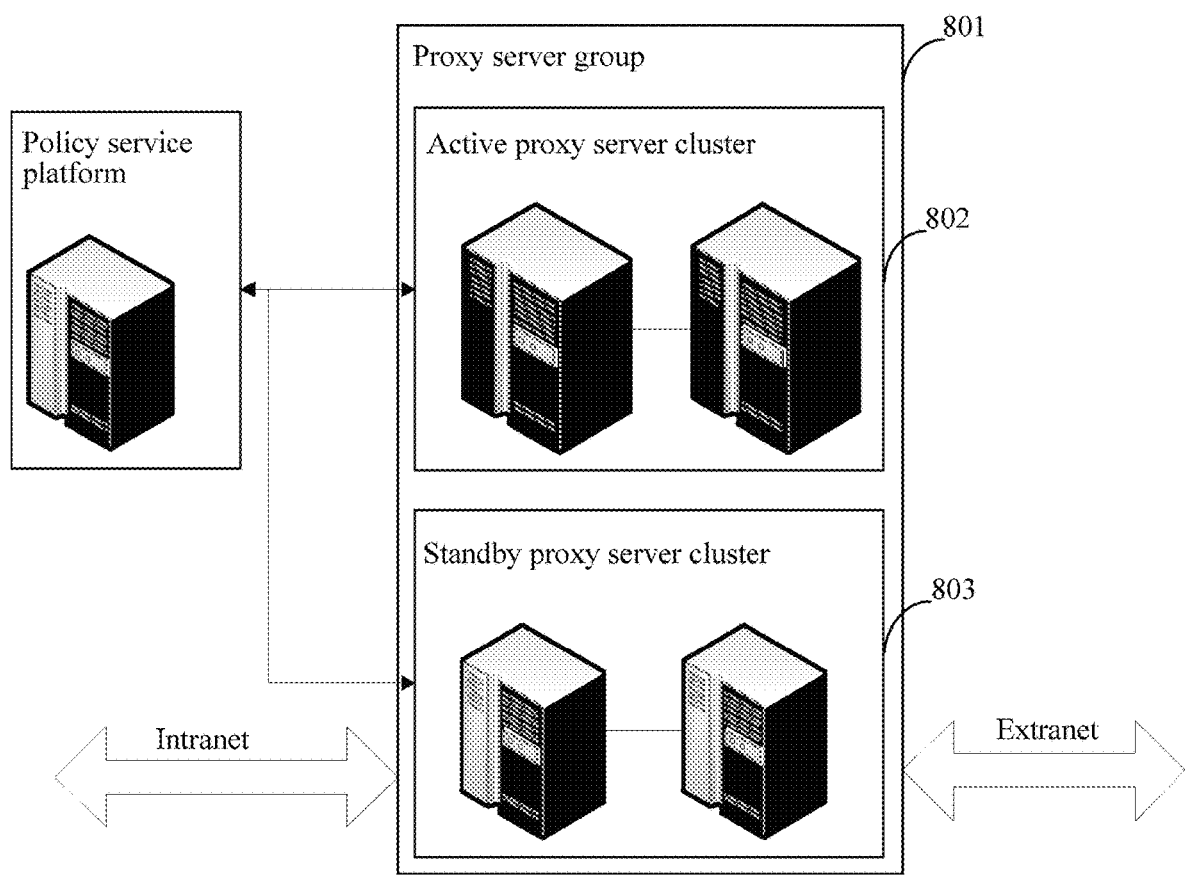
FIG. 8 is a schematic diagram of a proxy server cluster distribution according to an embodiment of the present disclosure.

To provide a stable proxy service, in an embodiment, as shown in FIG. 7, a proxy server 701 in an active-standby mode is used. A proxy service is provided by using an active proxy server 702, and when the active proxy server 702 is faulty, a standby proxy server 703 is started. Further, as shown in FIG. 8, in another embodiment, a proxy server 801 in an active-standby cluster mode is alternatively used. For example, a proxy service is provided by using an active proxy server cluster 802, and when the active proxy server cluster 802 is faulty, a standby proxy server cluster 803 continues to provide the proxy service.

In this embodiment of the present disclosure, the second network connectivity policy is implemented in a routing management manner, and stability of the second network connectivity policy is improved by setting an access proxy in an active-standby mode, to implement stable data communication between the source database and the target database.

Figure 9:
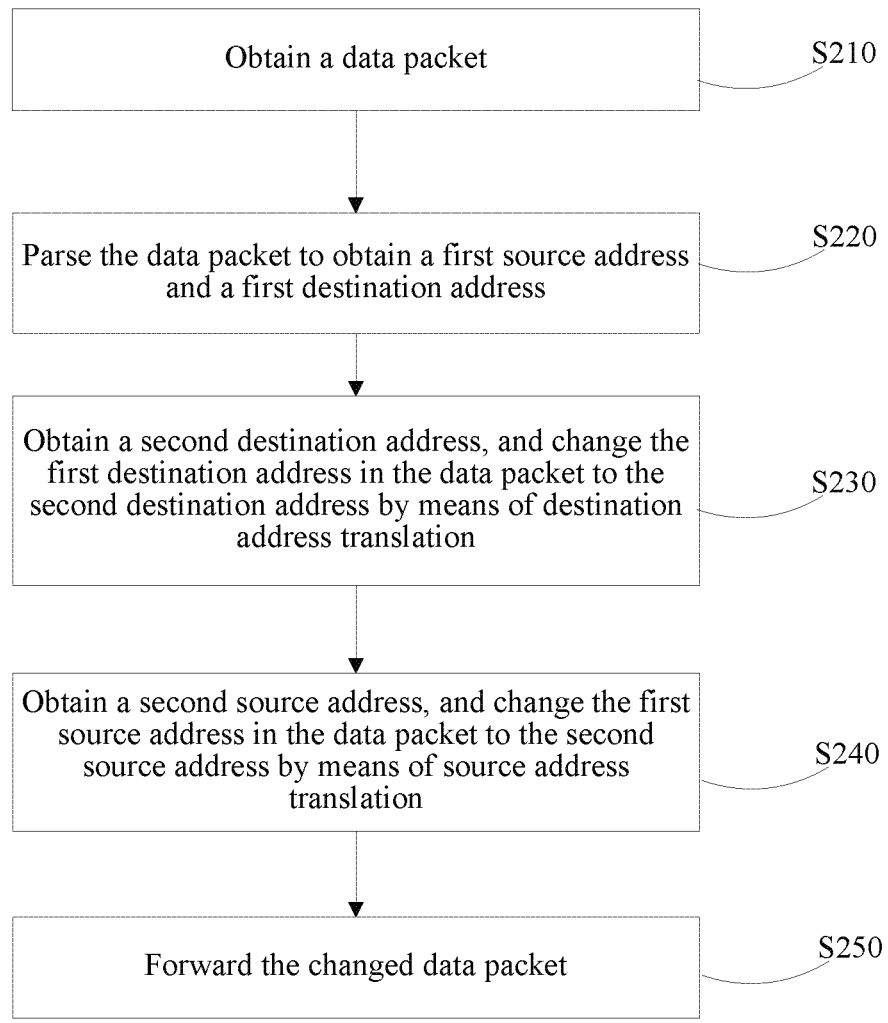
FIG. 9 is a flowchart of a method for establishing a communication link in a private network environment according to an embodiment of the present disclosure.

In an example process, as shown in FIG. 9, a communication link is established between the source database and the target database according to the third network connectivity policy when the network type is a private network in a cloud environment (e.g., the private network 402). The process can include:

S210. Obtain a data packet, the data packet being from a target database in a cloud environment or a source database in a private network in a cloud environment.

S220. Parse the data packet to obtain a first source address and a first destination address.

S230. Obtain a second destination address, and change the first destination address in the data packet to the second destination address by means of destination address translation.

In this embodiment of the present disclosure, an objective of performing destination network address translation (DNAT) is to map a first destination address located in a first network space to a second destination address in a second network space. The first source address and the first destination address of the data packet are original addresses of the data packet. The second destination address is a forwarding address, is input by a user on a web page of a database management system, (e.g., is input by a user on a web page of a database management system provided by a specific company to the user, and is stored in a local configuration file). In one example, the second destination address herein may be an address of the user in a private network (e.g., the private network 402) in a cloud environment.

S240. Obtain a second source address, and change the first source address in the data packet to the second source address by means of source address translation.

The reason why source network address translation (SNAT) is performed is that after data is sent to the second network space, a source address of the original data packet is a valid address of the first network space, but the source address of the data packet in the second network space may become an invalid address. Therefore, source address translation (SNAT) can be performed. There can be various generation algorithms for the alternative source address. In this embodiment, an idle network address is randomly obtained in the second network space, and the network address is applied to the source network address translation (SNAT) as the second source address.

S250. Forward the changed data packet.

Specifically, in this embodiment of the present disclosure, a bi-directional network address translation (NAT)-based gateway changes the obtained data packet, and forwards the changed data packet.

For example, using forwarding a data packet from a target database by using a NAT gateway as an example, a network address the target database is 10.238.158.161. The data packet is sent to a source database, and a network address of the source database is 10.192.133.2.

First, a data packet is obtained in a process of S210.

In a process of S220, the data packet is parsed. A source address of the data packet is 10.238.158.161, and a destination address thereof is 10.238.158.163. 10.238.158.163 is an IP address of the NAT gateway, and a port of the NAT gateway and the destination address of the data packet have a correspondence. In this embodiment of the present disclosure, the port No. 50001 of the NAT gateway may be configured to receive a data packet that is to be sent to 10.192.133.2. In some embodiments of the present disclosure, in the NAT gateway, a data packet received by a specific port is sent to a destination address corresponding to the port. In another embodiment, a correspondence between a port number and a first destination address of the data packet may be dynamically set according to requirements of data migration.

To facilitate address translation in processes of S230 and S240, the data packet received by the port No. 50001 of the NAT gateway having the IP address 10.238.158.163 is marked.

In the process of S230, destination address translation is performed on the marked data packet, a second destination address, 10.192.133.2, is obtained according to a correspondence between a port number in the NAT gateway and a first destination address of the data packet, and the first destination address of the data packet is changed into 10.192.133.2.

In the process of S240, an available second source address is obtained according to a preset source address obtaining algorithm. Specifically, in this embodiment of the present disclosure, by obtaining an idle IP address 10.192.133.10 located in a network space the same as that of the second source address and using the idle IP address 10.192.133.10 as a second source address, the first source address of the data packet is changed into 10.192.133.10.

In a process of S250, the changed data packet is forwarded to 10.192.133.2, where 10.192.133.2 is an IP address of the source database.

Further, because the source database is deployed in a private network in a cloud environment, to improve security and prevent a malicious attack from another network address, the data packet may be encapsulated by using Generic Routing Encapsulation (GRE) before the NAT gateway forwards the data packet. The GRE may be used for encapsulating data packets of some network layer protocols, so that the encapsulated data packets can be transmitted in an IPv4 network.

Figure 10:
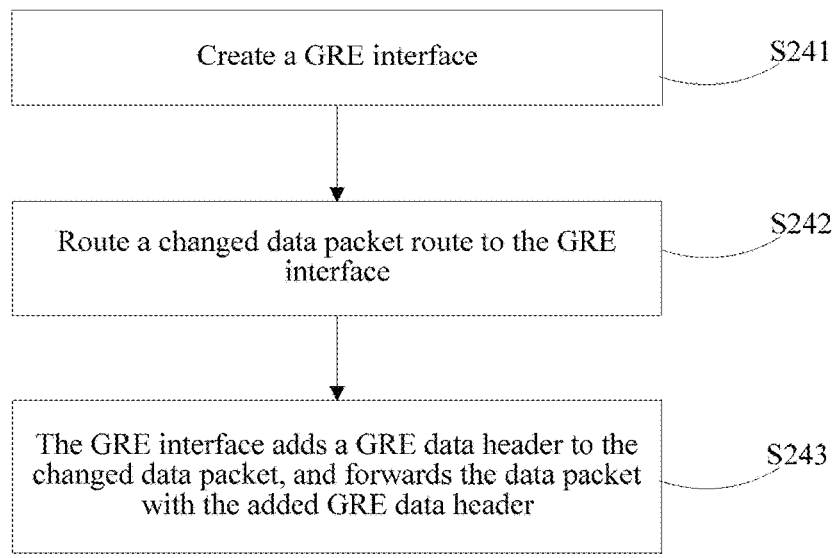
FIG. 10 is a flowchart of a data packet encapsulation method according to an embodiment of the present disclosure.

Therefore, after S240, and before S250 is performed, as shown in FIG. 10, the method further includes the following steps:

S241. Create a GRE interface.

If the target database is deployed on a physical device located in a private network in a cloud environment, different physical devices may correspond to different GRE interfaces. If the target database is deployed on a virtual machine in a private network in a cloud environment, when parent machines of virtual devices are different, different GRE interfaces can be created. The parent machine is a physical device running the virtual machine. If the target database is deployed on a virtual machine in a private network in a cloud environment, a parent machine obtains a data packet and sends the data packet to the virtual machine where the target database is deployed.

S242. Route the changed data packet route to the GRE interface.

A network address of the GRE interface may be assigned according to a preset assignment policy or may be dynamically set.

S243. The GRE interface adds a GRE data header to the changed data packet, and forwards the data packet with the added GRE data header.

Further, to improve communication efficiency of the source database and the target database and a transmission speed of a data packet, after a data packet passes by the NAT gateway, this embodiment of the present disclosure further provides a method for sending the data packet by using a pipe (e.g., an IP tunnel). To be specific, a pipe is created between the NAT gateway and a destination address of modified data packet, the data packet is transmitted through the pipe, and after the data packet is successfully sent, if it is needed to send back a transmission success response, the response is sent back by also using the pipe.

Figure 11:
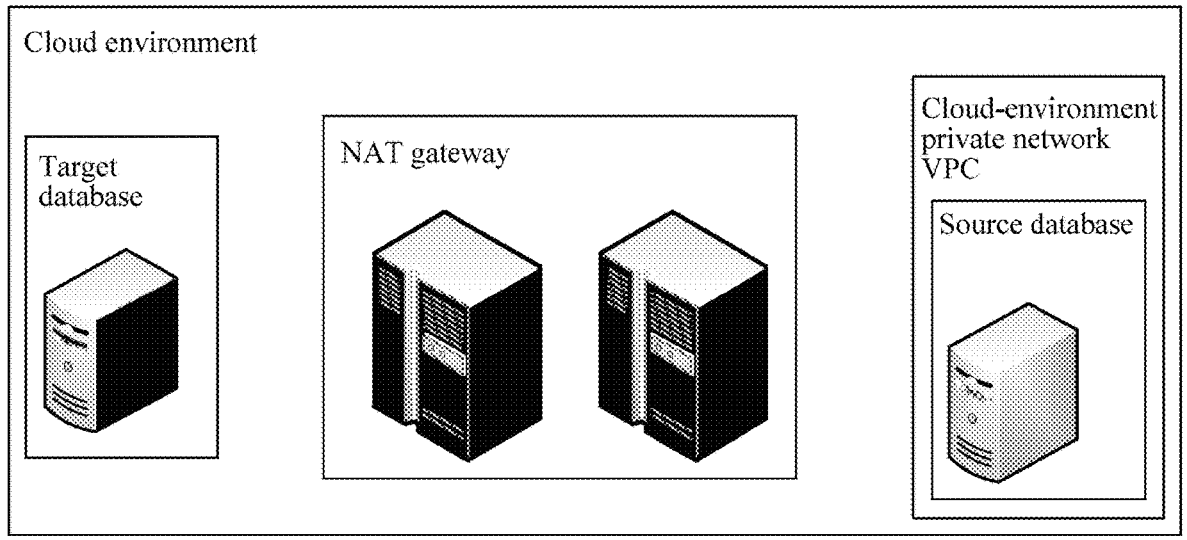
FIG. 11 is a schematic diagram of NAT gateway distribution according to an embodiment of the present disclosure.

To provide a stable proxy service, in this embodiment of the present disclosure, as shown in FIG. 11, a NAT gateway in an active-standby mode is used. The NAT gateway may provide a service in a single server form or a cluster form. The Virtual Private Cloud (VPC) is a cloud-environment private network, and is a network environment in which source data is located.

This embodiment of the present disclosure implements the third network connectivity policy by using a NAT-based gateway, improves stability of the third network connectivity policy by setting the NAT gateway in an active-standby mode, and further, improves security of data communication by using a GRE encapsulation manner and accelerates data transmission by using a pipe.

Figure 12:
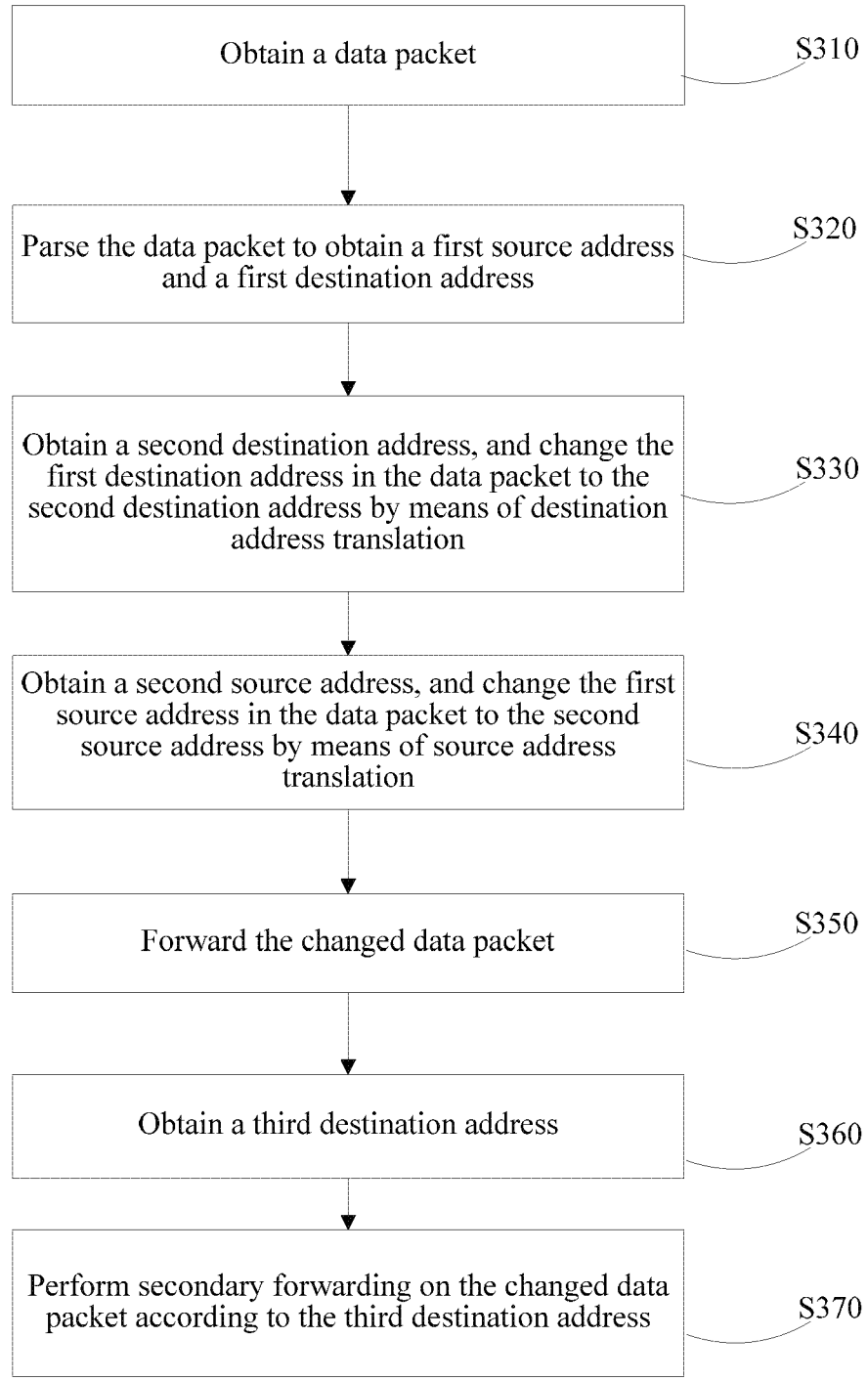
FIG. 12 is a flowchart of a method for establishing a communication link when a source database is in an IDC network environment interconnected to a private network in a cloud environment according to an embodiment of the present disclosure.

In an example process, as shown in FIG. 12, a communication link is established between the source database and the target database according to the third network connectivity policy when the network type is an DC network (e.g., the DC network 501) interconnected to a private network (e.g., the private network 503) in a cloud environment. The process can include:

S310. Obtain a data packet.

S320. Parse the data packet to obtain a first source address and a first destination address.

S330. Obtain a second destination address, and change the first destination address in the data packet to the second destination address by means of destination address translation. The first source address and the first destination address of the data packet are original addresses of the data packet. The second destination address is a forwarding address, is input by a user on a web page of a database management system, for example, is input by a user on a web page of a database management system provided by a specific company to the user, and is stored in a local configuration file. The second destination address herein may be an address of the user in a private network in a cloud environment.

S340. Obtain a second source address, and change the first source address in the data packet to the second source address by means of source address translation.

S350. Forward the changed data packet.

The source database is located in an DC network interconnected to a private network in a cloud environment. Therefore, communication between the source database and the target database can be implemented by traversing the private network in the cloud environment. Steps of S310 to S350 are similar to steps of S210 to S250, in which the changed data packet is forwarded to a second destination address in a private network based on a NAT gateway. A specific forwarding process is not described herein in detail again.

S360. Obtain a third destination address. The third destination address is a forwarding address, is input by a user on a web page of a database management system, for example, is input by a user on a web page of a database management system provided by a specific company to the user, and is stored in a local configuration file. The third destination address herein may be an address of an IDC network (e.g. the IDC network 501) that is outside the cloud environment and that is interconnected to the private network.

S370. Perform a second forwarding on the changed data packet according to the third destination address.

To send the changed data packet located in the private network (e.g., the private network 503) to a cloud database located in the IDC network (e.g. the IDC network 501), the second forwarding on the changed data packet by using a gateway can be performed. S360 to S370 can be implemented by configuring a gateway. In this case, the second destination address may be the address of the gateway.

Figure 13:
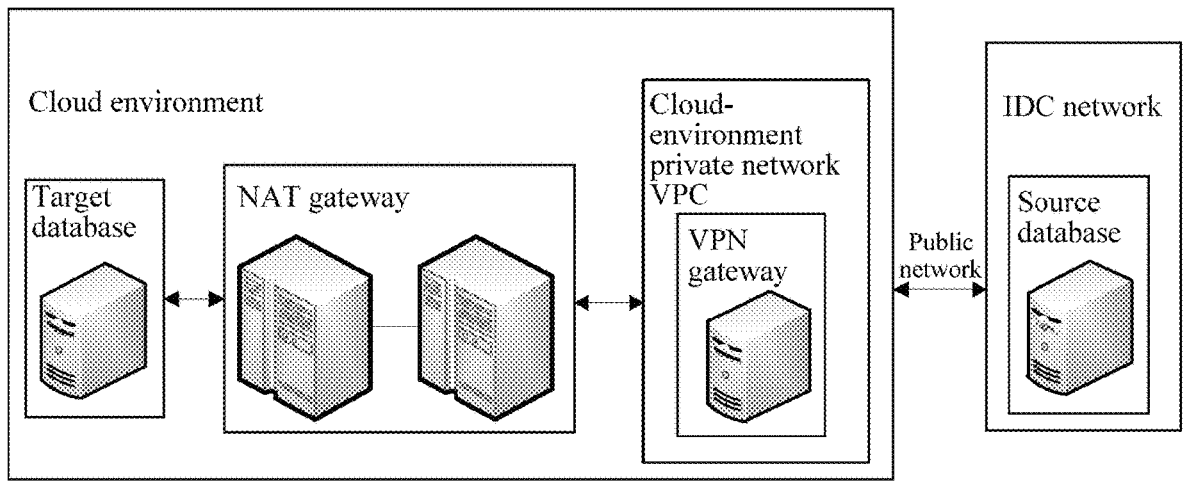
FIG. 13 is a schematic diagram of network distribution when a source database is in an IDC network environment interconnected to a private network in a cloud environment through a public network according to an embodiment of the present disclosure.

In some embodiments, if the network type of the source database is an IDC network interconnected to a private network in a cloud environment through a public network, a third destination address is obtained from a virtual private network (VPN)-based gateway, and secondary forwarding is performed on the changed data packet according to the third destination address. As shown in FIG. 13, a NAT gateway in an active-standby mode is used. The NAT gateway may provide a service in a single server form or a cluster form. The IDC is the network environment of the source database, and the source database and the CDB can perform communication by using a VPN gateway by means of a Virtual Private Cloud (VPC) through a public network. The VPC is a cloud-environment private network.

Figure 14:
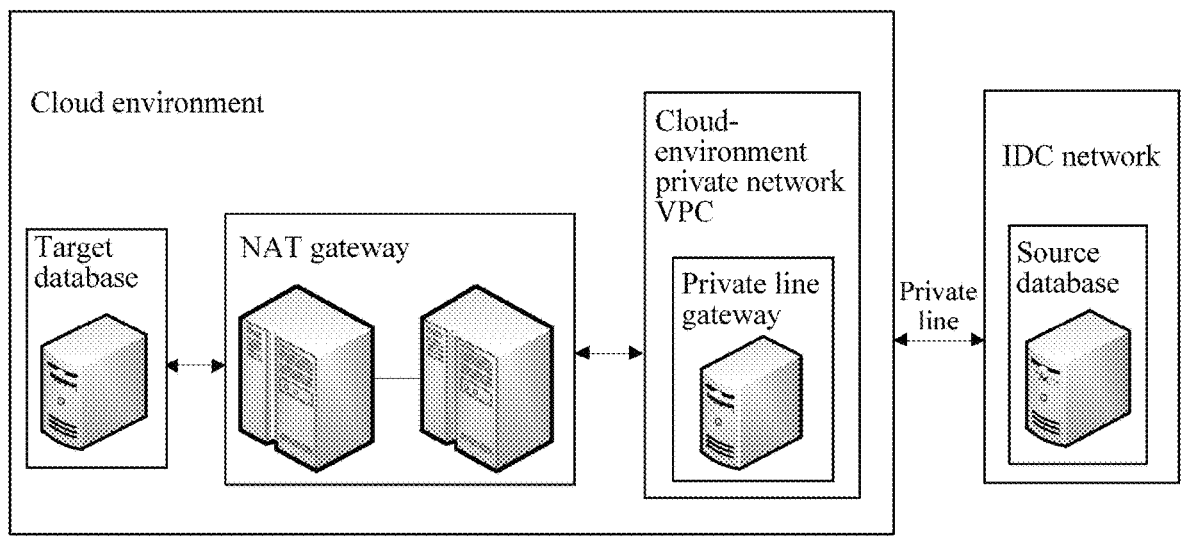
FIG. 14 is a schematic diagram of network distribution when a source database is in an IDC network environment interconnected to a private network in a cloud environment through a private line according to an embodiment of the present disclosure.

The third destination address may be obtained by using a private line gateway if the network type of the source database is an IDC network interconnected to a private network in a cloud environment through a private line, and secondary forwarding may be performed on the changed data packet according to the third destination address. As shown in FIG. 14, a NAT gateway in an active-standby mode is used. The NAT gateway may provide a service in a single server form or a cluster form. The IDC is the network environment of the source database, and the source database and the CDB can perform communication by using a private gateway by means of a Virtual Private Cloud (VPC) through a private line. The VPC is a cloud-environment private network. In the private line gateway, a private line with high confidentiality is established between the private network and the source database to forward the data packet to the third destination address, and compared with a VPN gateway, has better confidentiality.

In this embodiment of the present disclosure, the third network connectivity policy is implemented based on the NAT gateway in cooperation with another gateway (e.g., the VPN gate way in FIG. 13 or the private line gateway in FIG. 14), and is applicable to a more complex network topological structure.

In an embodiment of the present disclosure, before data migration is performed, to obtain a migration task and to-be-migrated data, a terminal where a source database is located creates a migration task, and performs a feasibility check on the migration task; and if the check is passed, the to-be-migrated data is obtained, and a migration environment is prepared; otherwise, data migration is not performed.

Figure 15:
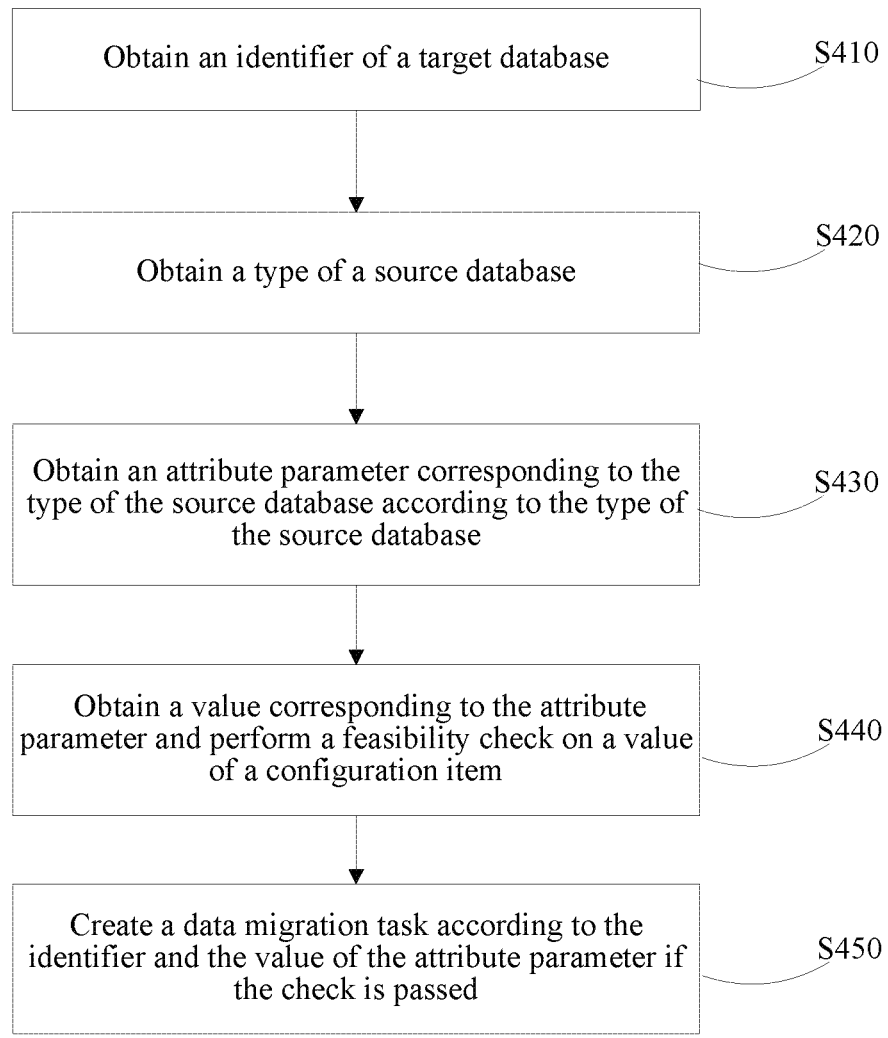
FIG. 15 is a flowchart of a method for creating a data migration task according to an embodiment of the present disclosure.

As shown in FIG. 15, the creating a data migration task includes:

S410. Obtain an identifier of a target database.

S420. Obtain a type of a source database.

S430. Obtain an attribute parameter corresponding to the type of the source database according to the type of the source database.

S440. Obtain a value corresponding to the attribute parameter and perform a feasibility check on a value of the configuration item.

S450. Create a data migration task according to the identifier and the value of the attribute parameter if the check is passed.

Figure 16:
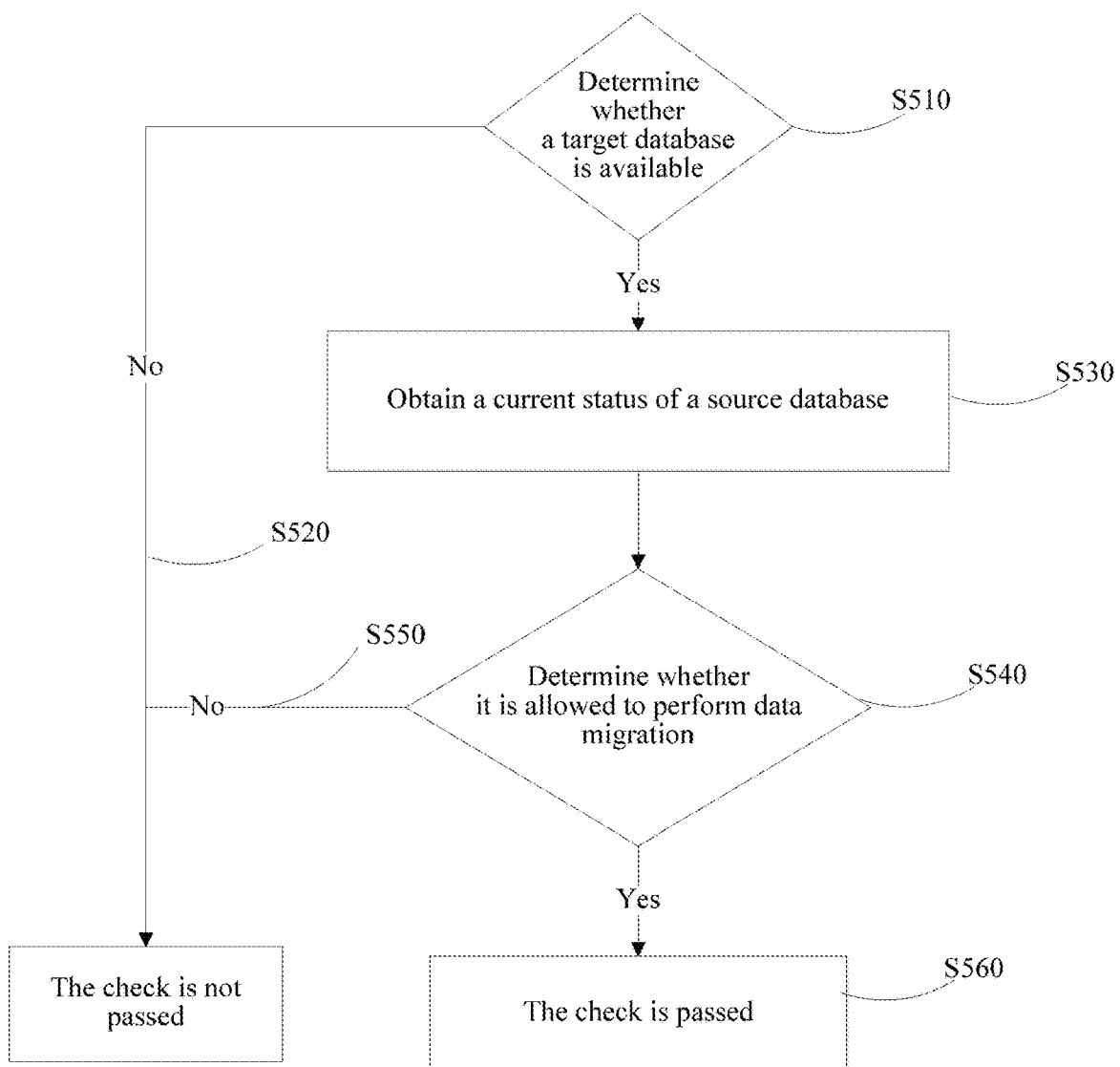
FIG. 16 is a flowchart of a feasibility check method according to an embodiment of the present disclosure.

Specifically, as shown in FIG. 16, the performing a feasibility check on a source data terminal includes:

S510. Determine whether the target database is available according to information of the target database.

As an example, the target database identifier may satisfy a non-null requirement. In this regard, as an example, an instance of a target database corresponding to the identifier of the target database may be a non-null instance. In addition, the target database may satisfy a vacancy requirement of data migration. For example, the target database is an empty database and does not have stored database data. The database data packet includes a library or stable structure that has been created and stores relevant of the structure. A target database that satisfies the vacancy requirement and the non-null requirement is an available target database.

In another embodiment, the target database may further satisfy a capacity requirement. For example, a capacity of the target database can be greater than that of the source database. If the target database fails to satisfy the capacity requirement, it is considered that the target database is unavailable.

S520. If not, the check is not passed.

S530. Otherwise, obtain a current status of the source database.

S540. Determine, according to the status, whether the source database allows to perform data migration.

S550. If not, the check is not passed.

S560. Otherwise, the check is passed.

Figure 17:
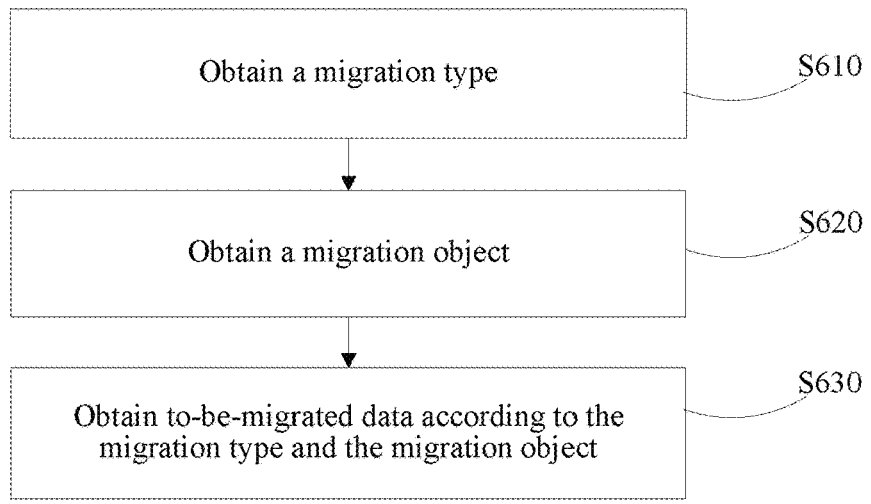
FIG. 17 is a flowchart of a method for obtaining to-be-migrated data according to an embodiment of the present disclosure.

As an example, as shown in FIG. 17, the obtaining to-be-migrated data includes:

S610. Obtain a migration type, the migration type including structure migration and/or content migration.

The structure migration refers to migrating a structure in a database, for example, migrating a structure of a database table instead of migrating specific data therein.

The content migration refers to migrating the structure and the content together, and for a database table, not only a structure thereof is migrated, but also specific data therein is migrated.

Further, in another embodiment, the migration type further includes incremental migration. If the migration type is the incremental migration, a master-slave relationship between the source database and the target database may be configured in the source database, so that data in the target database and data in the source database can change synchronously until a user, on his or her initiative, breaks the master-slave relationship.

The incremental migration can be combined with the structure migration or content migration.

S620. Obtain a migration object, the migration object including a data table and/or a database and being obtained according to relevant settings performed by a user.

S630. Obtain to-be-migrated data according to the migration type and the migration object.

Further, in another embodiment, to ensure that data in the source database is not destroyed during a migration process, after to-be-migrated data is obtained, the to-be-migrated data is backed up, and the backup is migrated as the to-be-migrated data to the target database.

In this embodiment of the present disclosure, a success rate of migration task is ensured by obtaining a migration task with complete information, and further, various migration types, such as structure migration, content migration, or incremental migration, are provided to satisfy various data migration requirements of a user, thereby improving user experience.

Figure 18:
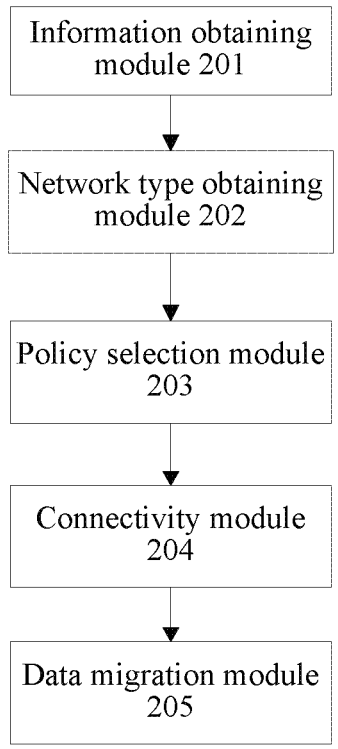
FIG. 18 is a block diagram of a database data migration apparatus according to an embodiment of the present disclosure.

The embodiments of the present disclosure provide a database data migration apparatus, as shown in FIG. 18. The apparatus can include an information obtaining module 201, a network type obtaining module 202, a policy selection module 203, a connectivity module 204, and a data migration module 205. The information obtaining module 201 is configured to obtain a migration task and to-be-migrated data. The migration task can include information of a source database and information of a target database. The network type obtaining module 202 is configured to determine a network type of the source database according to the information of the source database. The policy selection module 203 is configured to determine a network connectivity policy according to the network type. The connectivity module 204 is configured to establish a communication link between the source database and the target database according to the information of the target database and the network connectivity policy. The data migration module 205 is configured to perform communication between the source database and the target database by using the communication link, and migrate the to-be-migrated data from the source database to the target database.

Based on the information of the source database obtained by the information obtaining module 201, the network type obtaining module 202 obtains the network type of the source database, and the policy selection module 203 obtains the corresponding network connectivity policy. The communication module 204 implements network connectivity between the source database and the target database according to the connectivity policy. Based on the network connectivity, the data migration module 205 performs data migration.

In the embodiments of the present disclosure, different network connectivity policies are used according to different network types.

To implement the first network connectivity policy, a firewall configuration module 206 is used. The firewall configuration module 206 connects the source database and the target database by modifying configuration of a firewall.

Figure 19:
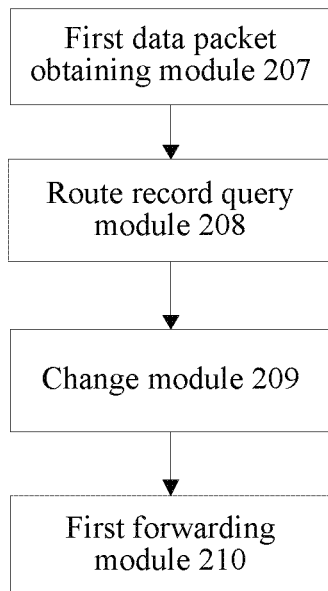
FIG. 19 is a block diagram of a related module for implementing a second network connectivity policy according to an embodiment of the present disclosure.

To implement the second network connectivity policy, the apparatus, as shown in FIG. 19, can further include a first data packet obtaining module 207, a route record query module 208, a change module 209, a first forwarding module 210. The first data packet obtaining module 207 can be configured to obtain a data packet, the data packet being from the source database or the target database. The route record query module 208 can be configured to query for a route record in a route management table according to the data packet. The change module 209 can be configured to change a source address and a destination address of the data packet according to the route record. The first forwarding module 210 can be configured to forward the changed data packet.

Based on the data packet obtained by the first data packet obtaining module 207, the route record query module 208 queries for the corresponding route record, the change module 209 changes the source address and the destination address of the data packet according to the route record, and the first forwarding module 210 forwards the changed data packet.

Figure 20:
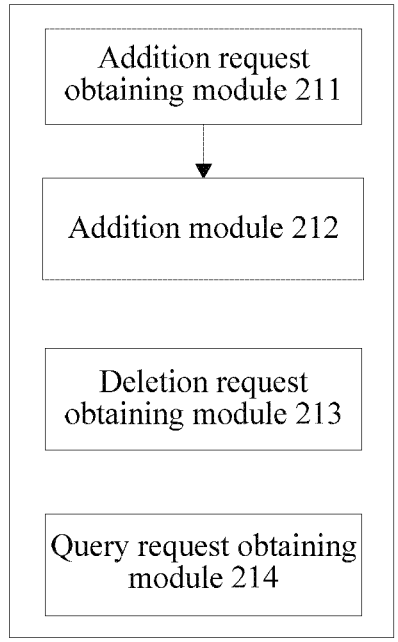
FIG. 20 is a block diagram of a related module for managing a route management table according to an embodiment of the present disclosure.

Further, to manage the route management table, the apparatus, as shown in FIG. 20, can further include an addition request obtaining module 211, an addition module 212, a deletion request obtaining module 213, and a query request obtaining module 214. The addition request obtaining module 211 can be configured to obtain a route addition request from a policy service platform. The addition module 212 can be configured to add a route record to the route management table according to the route addition request. The deletion request obtaining module 213 can be configured to obtain a route deletion request from the policy service platform. The query request obtaining module 214 can be configured to obtain a route query request from the policy service platform.

Figure 21:
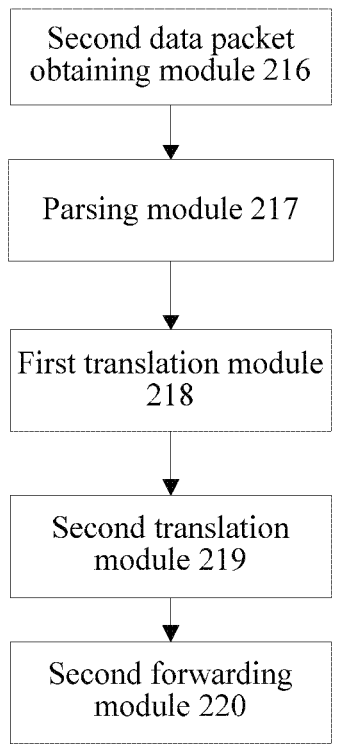
FIG. 21 is a block diagram of a related module for implementing a third network connectivity policy according to an embodiment of the present disclosure.

To implement the third network connectivity policy, as shown in FIG. 21, the apparatus can further include a second data packet obtaining module 216, a parsing module 217, a first translation module 218, a second translation module 219—and a second forwarding module 220. The second data packet obtaining module 216 can be configured to obtain a data packet; The parsing module 217 can be configured to parse the data packet to obtain a first source address and a first destination address. The first translation module 218 can be configured to obtain a second destination address, and change, by means of destination address translation, the first destination address in the data packet to the second destination address. The second translation module 219 can be configured to obtain a second source address, and change the first source address in the data packet to the second source address by means of source address translation. The second forwarding module 220 can be configured to forward the changed data packet.

Based on the data packet obtained by the second data packet obtaining module 216, the parsing module 217 obtains the first source address and the first destination address of the data packet. The first destination address and the first source address of the data packet are changed by using the first translation module 217 and the second translation module 218, and the second forwarding module 220 forwards the changed data packet.

Figure 22:
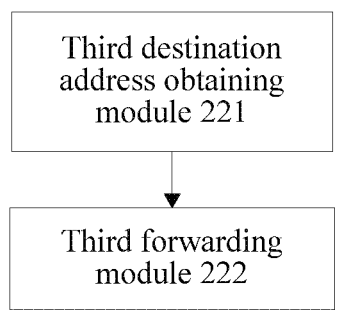
FIG. 22 is a block diagram of a related module for performing secondary forwarding on a modified data packet according to an embodiment of the present disclosure.

Further, the apparatus, as shown in FIG. 22 can further include a third destination address obtaining module 221 configured to obtain a third destination address, and a third forwarding module 222 configured to perform secondary forwarding on the changed data packet according to the third destination address.

This embodiment provides, based on the same inventive concept, a database data migration apparatus. This embodiment can be used for implementing the database data migration method provided in the foregoing embodiment.

Figure 23:
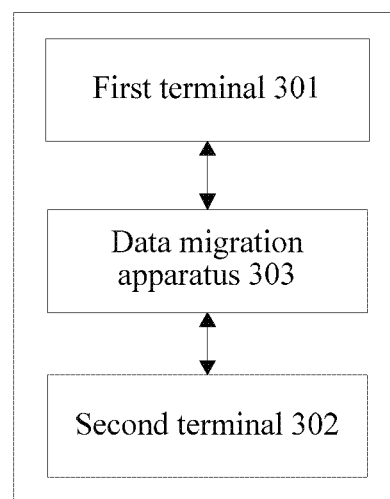
FIG. 23 is a block diagram of a system according to an embodiment of the present disclosure.

The embodiments of the present disclosure further provide a data migration system, as shown in FIG. 23, including a first terminal 301, a second terminal 302, and a data migration apparatus 303.

The first terminal 301 is a device in which a source database is located.

The second terminal 302 is a device in which a target database is located.

The data migration apparatus 303 may be the apparatus provided in the foregoing embodiment.

This embodiment provides, based on the same inventive concept, a database data migration system. This embodiment can be used for implementing the database data migration method provided in the foregoing embodiment. The database data migration method provided in the embodiments of the present disclosure covers various database environments of a user, and network types supported by the database data migration method include an infrastructure network, a VPC network, an IDC environment, and a public network, thereby notably reducing difficulty in data migration performed by a user.

Figure 24:
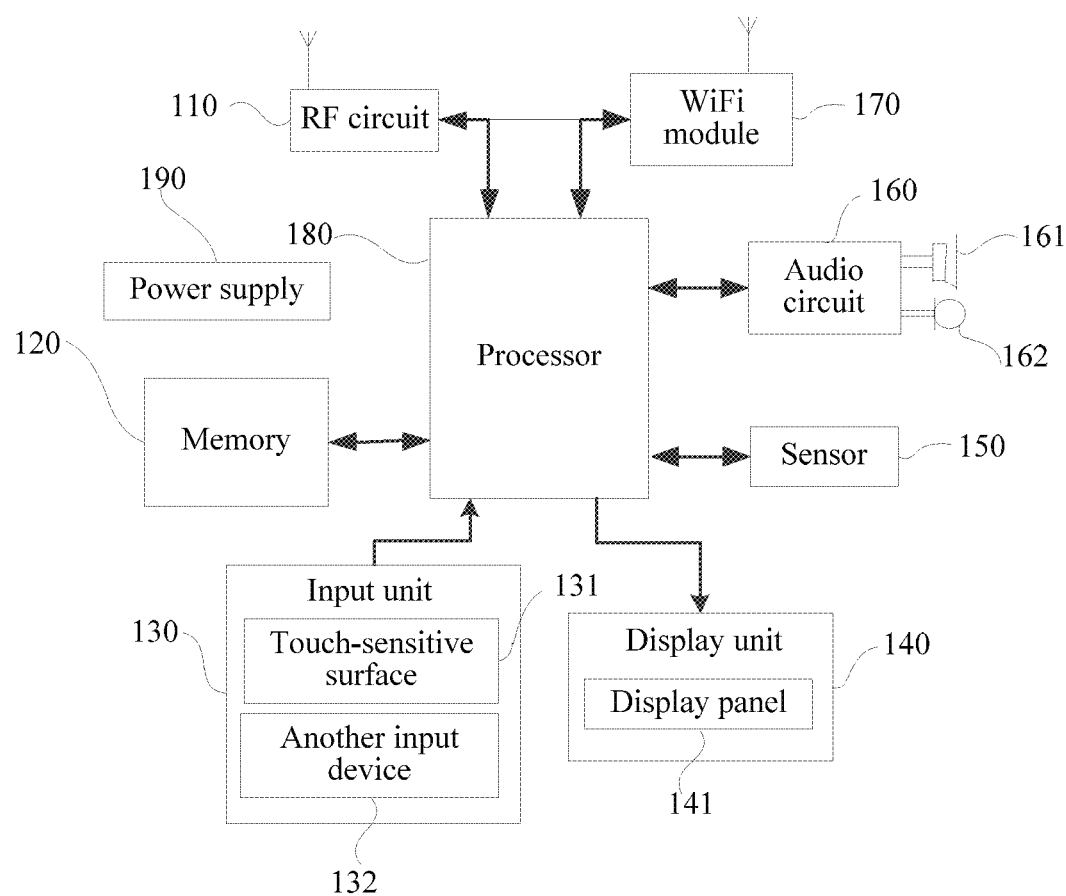
FIG. 24 is a structural block diagram of a terminal according to an embodiment of the present disclosure.

The embodiments of the present disclosure further provide a terminal. As shown in FIG. 24, the terminal may be used for implementing the database data migration method provided in the foregoing embodiment. Specifically:

The terminal may include components such as a radio frequency (RF) circuit 110, a memory 120 including one or more computer readable storage media, an input unit 130, a display unit 140, a sensor 150, an audio circuit 160, a wireless fidelity (WiFi) module 170, processing circuitry such as a processor 180 including one or more processing cores, and a power supply 190. A person skilled in the art may understand that the structure of the terminal shown in FIG. 24 does not constitute a limitation to the terminal, and the terminal may include more components or fewer components than those shown in the figure, or some components may be combined, or a different component deployment may be used.

The RF circuit 110 may be configured to receive and send signals during information receiving and sending or during a call. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program, data, and a module. The processor 180 runs the software program and module stored in the memory 120, to implement various functional applications and data processing. The memory 120 may mainly include a program storage area and a data storage area. The program storage area may store an operating system, an application program used by a function, and the like. The data storage area may store data created according to use of the terminal, and the like. In addition, the memory 120 may be a non-transitory memory. The memory may include a high speed random access memory, and may further include a non-volatile memory, such as at least one magnetic disk storage device, a flash memory, or other volatile solid-state storage devices. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical or track ball signal input related to the user setting and function control. Specifically, the input unit 130 may include a touch-sensitive surface 131 and another input device 132. The touch-sensitive surface 131, also referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 180. Moreover, the touch controller can receive and execute a command sent by the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to: one or more of a physical keyboard, a functional key (such as a volume control key or a switch key), a track ball, a mouse, and a joystick.

The display unit 140 may be configured to display information input by the user or information provided for the user, and various graphical user interfaces of the terminal. The graphical user interfaces may be composed of graphics, text, icons, videos, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 141 transfers the touch operation to the processor 180, to determine the type of the touch event. Then, the processor 180 provides a corresponding visual output on the display panel 1241 according to the type of the touch event. Although, in FIG. 14, the touch-sensitive surface 131 and the display panel 141 are used as two separate parts to implement input and output functions, in some embodiments, the touch-sensitive surface 131 and the display panel 141 may be integrated to implement the input and output functions.

The terminal may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the terminal (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal, are not described in detail herein.

The audio circuit 160, a speaker 161, and a microphone 162 may provide audio interfaces between the user and the terminal. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal.

WiFi is a short distance wireless transmission technology. The terminal may help, by using the WiFi module 170, the user to receive and send emails, browse a web page, access streaming media, and so on, which provides wireless broadband Internet access for the user. Although FIG. 24 shows the WiFi circuit 170, it may be understood that the wireless communications unit is not a necessary component of the terminal, and the wireless communications unit may be omitted as long as the scope of the essence of the present disclosure is not changed.

The processor 180 is the control center of the terminal, and is connected to various parts of the entire terminal by using various interfaces and wires. By running or executing the software program and/or module stored in the memory 120, and invoking data stored in the memory 120, the processor 180 performs various functions and data processing of the terminal, thereby performing overall monitoring on the terminal. Optionally, the processor 180 may include one or more processor cores. The processor 180 may integrate an application processor, a modem processor, and another routing apparatus. The application processor mainly processes an operating system, a user interface, an application program, and the like. The modem processor mainly processes wireless communication. It may be understood that the foregoing modem processor may alternatively not be integrated into the processor 180.

The terminal further includes the power supply 190 (such as a battery) for supplying power to the components. The power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal may further include a camera, a Bluetooth module, and the like, which are not described herein. Specifically, in this embodiment, the display unit of the terminal is a touchscreen display, and the terminal further includes a memory and one or more programs. The one or more programs are stored in the memory and executed by one or more processors. The one or more programs can include an information obtaining module 201 used for obtaining a migration task and to-be-migrated data, the migration task including information of a source database and information of a target database, a network type obtaining module 202 used for determining a network type of the source database according to the information of the source database, a policy selection module 203 used for determining a network connectivity policy according to the network type, a connectivity module 204 used for establishing a communication link between the source database and the target database according to the information of the target database and the network connectivity policy, and a data migration module 205 used for performing communication between the source database and the target database by using the communication link, and migrate the to-be-migrated data from the source database to the target database.

In conclusion, the terminal provided by the embodiments of the present disclosure can be used for implementing a database data migration method. The database data migration method provided in the embodiments of the present disclosure covers various database environments of a user, and network types supported by the database data migration method include an infrastructure network, a VPC network, an IDC environment, and a public network, thereby notably reducing difficulty in data migration performed by a user.

The embodiments of the present disclosure further provide a computer-readable storage medium. The computer-readable storage medium may be a computer-readable storage medium included in the memory in the foregoing embodiments or a computer-readable storage medium that exists alone and that is not assembled into the terminal. The computer-readable storage medium stores one or more programs. The one or more program are executed by one or more processors to implement any embodiment of the foregoing method in the embodiments of the present disclosure.

The embodiments of the present disclosure provide a computer-readable storage medium, capable of being used to implement a database data migration method. The database data migration method provided in this embodiment of the present disclosure covers various database environments of a user, and network types supported by the database data migration method include an infrastructure network, a VPC network, an IDC environment, and a public network, thereby notably reducing difficulty in data migration performed by a user.

In conclusion, the database data migration method, the apparatus, the terminal, system, and the storage medium provided by the embodiments of the present disclosure, on the one hand, provide, for various complex network environments, corresponding policies for network connectivity, so as to provide a database data migration service with universality for a user, and on the other hand, can migrate, while adapting to different complex network environments, database data on a user end quickly and accurately to a target database, thereby reducing manual intervention and improving migration efficiency.

In the foregoing embodiments of this application, descriptions of the embodiments have different emphases, and as for parts that are not described in detail in one embodiment, reference can be made to the relevant description of the other embodiments.

In the several embodiments provided in the present application, it should be understood that the disclosed terminal may be implemented in a way different from the above examples. The described system embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

The above descriptions are merely exemplary embodiments of the present disclosure, and it should be noted that, a person of ordinary skill in the art may make various improvements and refinements without departing from the spirit of the embodiments of the present disclosure. All such modifications and refinements should also be intended to be covered by the embodiments of the present disclosure.

What is claimed is:

1. A database data migration method, comprising:
obtaining a migration task of migrating data from a source database to a target database, the migration task indicating a network type of a source network with which the source database is connected, the target database located in a cloud environment;
determining a network connectivity policy according to the network type of the source network of the source database, the network connectivity policy indicating a configuration of a communication link between the source database and the target database;
configuring the communication link between the source database and the target database according to the network connectivity policy, such that the data is migrated from the source database to the target database via the communication link, wherein
based on the network connectivity policy being determined to be a second network connectivity policy when the network type is a public network outside the cloud environment,
the configuring the communication link includes configuring a route management-based access proxy server, and
the method further includes:
obtaining a data packet, the data packet being from the source database or the target database;
querying for a route record in a route management table according to the data packet;
changing a source address and a destination address of the data packet according to the route record when the route record exists; and
forwarding the changed data packet.

2. The method according to claim 1, wherein the migration task comprises a type of the source database and an attribute parameter corresponding to the type of the source database.

3. The method according to claim 1, wherein the network type of the source network is one of:
an infrastructure network in the cloud environment,
a first private network in the cloud environment,
an IDC network interconnected to a second private network in the cloud environment and located in an Internet data center and outside of the cloud environment, and
the public network outside the cloud environment.

4. The method according to claim 1, wherein
the determining the network connectivity policy comprises:
determining the network connectivity policy is a first network connectivity policy when the network type is an infrastructure network in the cloud environment, and
the configuring the communication link comprises:
configuring a firewall between the source database and the target database when the first network connectivity policy is determined.

5. The method according to claim 1, wherein the configuring the route management-based access proxy server further comprises:
generating, according to the migration task, a route addition request for adding a route record to the route management table stored in the route management-based access proxy server; and
transmitting the route addition request to the route management-based access proxy server.

6. The method according to claim 1, wherein the route management-based access proxy server is configured to access the source database and the target database.

7. The method according to claim 1, wherein the configuring the route management-based access proxy server further comprises:
based on a HyperText Transfer Protocol, transmitting a route addition request, a route deletion request, and/or a route query request to the route management-based access proxy server.

8. The method according to claim 1, wherein the route management-based access proxy server comprises an active proxy server and a standby proxy server.

9. The method according to claim 1, wherein
the determining the network connectivity policy comprises:
determining the network connectivity policy is a third network connectivity policy when the network type is a private network in the cloud environment or an IDC network interconnected to a private network in the cloud environment, and
the configuring the communication link comprises:
configuring a bi-directional network address translation-based access proxy.

10. The method according to claim 9, further comprising:
obtaining a data packet;
parsing the data packet to obtain a first source address and a first destination address;
obtaining a second destination address from a configuration file, and changing the first destination address in the data packet to the second destination address by means of destination address translation;
obtaining a second source address, and changing the first source address in the data packet to the second source address by means of source address translation; and
forwarding the changed data packet.

11. The method according to claim 9, further comprising:
obtaining a data packet;
parsing the data packet to obtain a first source address and a first destination address;
obtaining a second destination address from a configuration file, and changing the first destination address in the data packet to the second destination address by means of destination address translation;
obtaining a second source address, and changing the first source address in the data packet to the second source address by source address translation;
forwarding the changed data packet;
obtaining a third destination address from the configuration file; and
performing secondary forwarding on the changed data packet according to the third destination address.

12. The method according to claim 11, wherein the third destination address is obtained by using a virtual dedicated network-based gateway when the network type of the source database is an IDC network interconnected to a private network in a cloud environment through a public network, and secondary forwarding is performed on the changed data packet according to the third destination address.

13. The method according to claim 11, wherein the third destination address is obtained by using a private line gateway when the network type of the source database is an IDC network interconnected to a private network in a cloud environment through a private line, and secondary forwarding is performed on the changed data packet according to the third destination address.

14. The method according to claim 10, wherein a bi-directional network address translation-based gateway changes the obtained data packet, and forwards the changed data packet to the second destination address.

15. An apparatus for database data migration, comprising circuitry configured to:
obtain a migration task of migrating data from a source database to a target database, the migration task indicating a network type of a source network with which the source database is connected, the target database located in a cloud environment;
determine a network connectivity policy according to the network type of the source network of the source database, the network connectivity policy indicating a configuration of a communication link between the source database and the target database; and
configure the communication link between the source database and the target database according to the network connectivity policy, such that the data is migrated from the source database to the target database via the communication link, wherein
based on the network connectivity policy being determined to be a second network connectivity policy when the network type is a public network outside the cloud environment, the circuitry is further configured to:
configure a route management-based access proxy server in the configuration of the communication link,
obtain a data packet, the data packet being from the source database or the target database,
query for a route record in a route management table according to the data packet,
change a source address and a destination address of the data packet according to the route record when the route record exists, and
forward the changed data packet.

16. The apparatus according to claim 15, wherein the circuitry is further configured to:
determine the network connectivity policy is a first network connectivity policy when the network type is an infrastructure network in the cloud environment, and
configure a firewall between the source database and the target database when the first network connectivity policy is determined.

17. A non-transitory computer-readable medium storing a program executable by a processor to perform a method, the method comprising:
- obtaining a migration task of migrating data from a source database to a target database, the migration task indicating a network type of a source network with which the source database is connected, the target database located in a cloud environment;
- determining a network connectivity policy according to the network type of the source network of the source database, the network connectivity policy indicating a configuration of a communication link between the source database and the target database; and
- configuring the communication link between the source database and the target database according to the network connectivity policy, such that the data is migrated from the source database to the target database via the communication link, wherein based on the network connectivity policy being determined to be a second network connectivity policy when the network type is a public network outside the cloud environment, the configuring the communication link includes configuring a route management-based access proxy server, and the method further includes:
- obtaining a data packet, the data packet being from the source database or the target database,
- querying for a route record in a route management table according to the data packet,
- changing a source address and a destination address of the data packet according to the route record when the route record exists, and
- forwarding the changed data packet.

* * * * *